've
United States Patent
Koloc

[11] 3,720,885
[45] March 13, 1973

[54] TRANSVERSE FLOW CARBON DIOXIDE LASER SYSTEM

[75] Inventor: Paul M. Koloc, College Park, Md.

[73] Assignee: The United States of America as represented by the Secretary of the Navy

[22] Filed: April 30, 1971

[21] Appl. No.: 139,065

[52] U.S. Cl. ................................331/94.5, 313/329
[51] Int. Cl. ............H01s 3/22, H01s 3/09, H01s 3/02
[58] Field of Search ......331/94.5; 330/4.3; 332/7.51; 250/199; 313/329

[56]  References Cited

UNITED STATES PATENTS 3,391,281   7/1968   Gerkens..............................260/199

FOREIGN PATENTS OR APPLICATIONS 914,037   6/1954   Germany..............................313/329
902,527   1/1954   Germany..............................313/329

OTHER PUBLICATIONS

Hill, AIAA 9th Aerospace Sciences Meeting Paper No. 71-65, New York, Jan 25-27, 1971, 5 pages.

Primary Examiner—Ronald L. Wibert
Assistant Examiner—R. J. Webster
Attorney—R. S. Sciascia, J. A. Cooke, R. J. Erickson and K. F. Krosin

[57]   ABSTRACT

A mixture of carbon dioxide, helium and nitrogen gases are circulated through a closed loop system and flow transverse to an optical cavity at near sonic velocities. The gas mixture is cooled by a heat exchanger before entering and upon leaving a compressor. The gas mixture then flows through a gas diverter. A portion of the gas mixture leaving the diverter then flows through a multiple nozzle insulating partition, through a metallic screen, into a pre-ionizing cavity, and into a metallic honeycomb which is aligned with the gas flow. The screen and honeycomb serve as electrodes for an electric field that pre-ionizes the gas and insures a uniform discharge in a flow discharge region. The pre-ionized gas passes through the metallic honeycomb into the glow discharge region to a second metallic honeycomb. Each honeycomb serves as an electrode for a direct current glow discharge which forms the active laser medium of the optical cavity. Here, the energized gases produce continuous laser action in the optical cavity. The remainder of the gas mixture from the gas diverter flows across the ends of the optical cavity to cool and electrically insulate the laser end mirrors and confine the glow discharge to the glow discharge region. After the gases pass through the second metallic honeycomb they pass into a catalytic antipollution filter and then to the first heat exchanger, completing the cycle.

10 Claims, 4 Drawing Figures

INVENTOR
Paul M. Koloc

BY  J. A. Cooke  ATTORNEY
Kenneth E. Krosin  AGENT

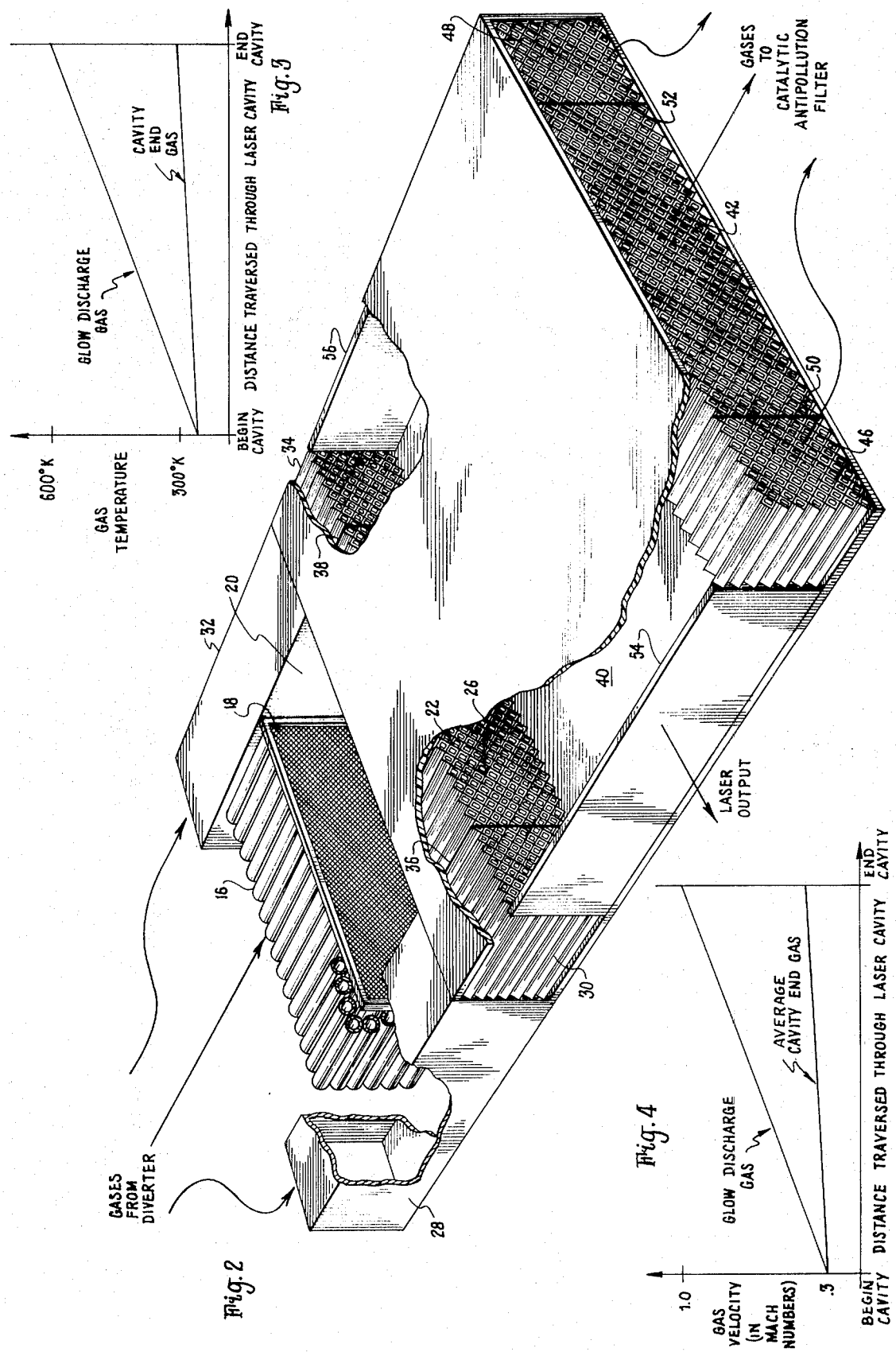

3,720,885

TRANSVERSE FLOW CARBON DIOXIDE LASER SYSTEM

BACKGROUND OF THE INVENTION

This invention relates generally to gas laser systems and more particularly to gas dynamic or gas transport laser systems. In one type of prior art gas dynamic laser, the gas is energized by heating a large amount of gas to high temperature and pressure, usually by chemical means. The gas is then expanded through a supersonic nozzle where it undergoes expansion cooling. The molecular vibrational and rotational energy of the gas remains, however, long enough to be extracted by laser action. Although this system is capable of enormous power, the efficiency is very low since a large mass of gas is heated to very high temperatures and only a small fraction of the resulting energy goes into laser power. The optical system is subject to physical vibration, contamination, or erosion, and turbulent degradation of the laser beam in the supersonic gas stream. Furthermore, the physical size of the laser including the massive amounts of sometimes lethal gas fuels is large. Solid fuel gas dynamic lasers may be smaller but have limited run times.

Another type of prior art laser is the gas transport laser. In this device the gas is blown across, or transverse to, an optical cavity. As the gas enters the optical cavity from a long slot, it passes through an electric discharge immediately adjacent to the optical cavity. The gas is cooled and recirculated through a blower. This laser achieves a kilowatt of continuous output at modest efficiencies without consuming vast amounts of gas. However, the beam divergence is very high and consequently, the brightness is low. Since the gas flows through the electric discharge which is transverse to both the flow and the optical cavity, the gas is energized non-uniformly and tends to blow the electric discharge downstream in a ragged, turbulent manner. As the gas moves out of the electric discharge into the optical cavity, its laser energy is depleted by thermal relaxation and stimulated emission. Since the gas is not being energized in the optical cavity, its gain or emission power drops off sharply as the gas moves across the optical cavity. These effects contribute to the high beam divergence, low brightness, and modest efficiency of the laser.

A variation of the gas transport laser has an electric field coaxial with the gas flow, but the anode discharge consists of arc discharges which are broken up and mixed by an array of shock channels. The turbulence of the supersonic flowing gas is reduced subsequently by a porous screen which marks the boundary of the optical cavity and glow discharge region. This prior art device has two obvious disadvantages. First, the anode arc discharge and streamers produce an enormously disproportionate amount of counterproductive gas products. Second, the power injected into this device that produces arcing is wasted, since the laser efficiency for arc streams is essentially negligible.

SUMMARY OF THE INVENTION

Accordingly, one object of the present invention is to provide a new and improved gas dynamic or gas transport laser.

Another object of the instant invention is to provide a high efficiency gas dynamic laser capable of continuously producing high output power.

Still another object of the present invention is the provision of a transverse flow carbon dioxide laser system having high output power and efficiency with low dissipation of gases and low beam divergence.

A further object of the present invention is the provision of a transverse flow carbon dioxide laser system that is compact, sturdy and capable of high output power.

A still further object of the present invention is the reduction of counterproductive gases and the prevention of arcing in a gas dynamic or gas transport laser.

Briefly, these and other objects of the present invention are attained by providing a transverse flow carbon dioxide laser system wherein the laserable gas flows transverse to an optical cavity at near sonic velocities. Prior to entering the optical cavity, the gas is compressed, cooled, pre-ionized, and straightened into a laminar flow. The gas then flows into the optical cavity where an electric field produces a glow discharge in the gas. This, in turn, causes the gas to become energized, thereby producing laser action in the optical cavity. The gas then flows out of the optical cavity where it is chemically reconstituted, cooled, and then recycled.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein:

FIG. 2 is a pictorial view partially in cross-section of the multiple nozzle arrangement, screen electrode, metallic honeycomb electrodes, insulator honeycombs and laser cavity;

FIG. 3 is a plot of gas temperature versus distance travelled through the laser cavity for the present invention; and FIG. 4 is a plot of gas velocity versus distance travelled through the laser cavity for the present invention.

DESCRIPTION OF THE PREFERRED EMBODIMENT

Figure 1:
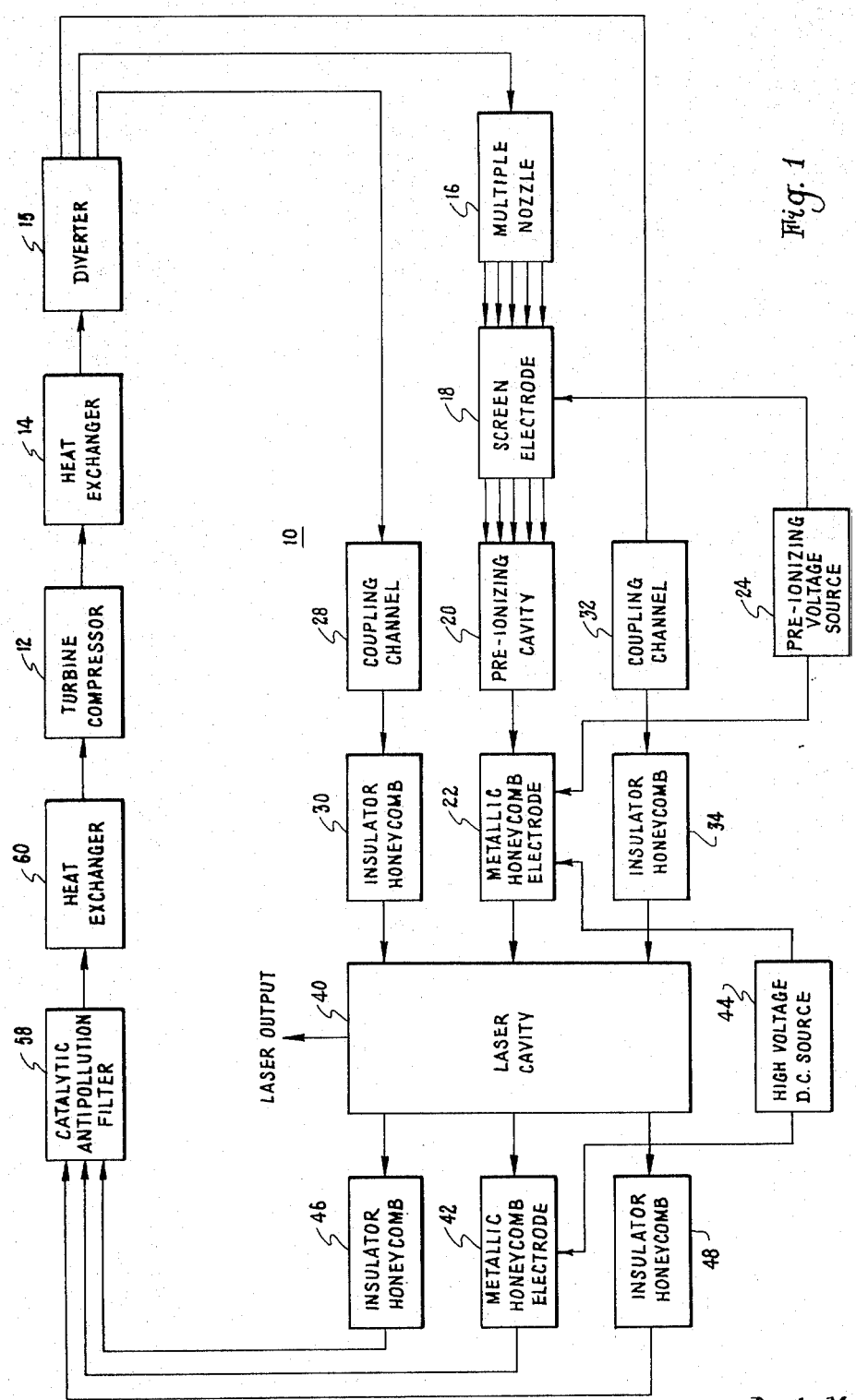
FIG. 1 is a block diagrammatic view of the transverse flow carbon dioxide laser system according to the present invention.

Referring now to the drawings, wherein like reference characters designate corresponding parts throughout the several views, and more particularly to FIG. 1 thereof, a transverse-flow carbon dioxide laser system 10 is shown as a closed loop system. The gas used in laser system 10 consists of a mixture of He, $N_2$ and $CO_2$. The gas mixture ratio may be, for example, 50 percent, 25 percent, and 25 percent of these three gases, respectively. Alternatively, substantial amounts of Xe may be used in place of a portion of He. A conventional turbine compressor 12 compresses the gas to a sufficient pressure to drive it through the remaining stages of the present invention, described hereinafter, at high subsonic velocities, such as mach 0.3. The hot gas emerging from turbine compressor 12 is cooled in a conventional water-cooled heat exchanger 14. Cooling the gas upon leaving the compressor insures optimum cavity injection temperatures. The gas then flows into a conventional gas diverter 15, such as a diaphragm arrangement where it is separated into three portions, one of which is large, and two of which are small. The large volume portion then flows through a multiple nozzle 16. As shown with reference to FIG. 2, multiple nozzle 16 may consist of a bundle of closely packed tubes through which the gas flows. Alternatively, multiple nozzle 16 may consist of a rectangular plug through which numerous closely adjacent shaped holes have been bored. Multiple nozzle 16 serves to prevent the pre-ionizing electric discharge described hereinafter from short circuiting upstream. Furthermore, there is some slight additional expansion cooling of the gas as it passes through nozzle 16.

Referring again to FIG. 1, as the gas leaves multiple nozzle 16 it passes through a screen electrode 18 into a pre-ionizing cavity 20 and through a metallic honeycomb electrode 22. Weak ionization or electron-ion pair seeding is produced in cavity 20 by the application of a pre-ionizing voltage between screen electrode 18 and metallic honeycomb electrode 22. This voltage is furnished by a pre-ionizing voltage source 24 which may be, for example, a ballast limited high voltage source. Alternatively, pre-ionizing voltage source 24 may be a high frequency voltage source.

The pre-ionizing elements are illustrated pictorially in FIG. 2. Screen electrode 18 consists of a mesh screen which is positioned adjacent multiple nozzle 16, and pre-ionizing cavity 20 is merely an enclosed region. Metallic honeycomb electrode 22, which is positioned at the opposite end of pre-ionizing cavity 20 relative to screen electrode 18, has the external dimensions of a solid rectangle and internally consists of a large number of honeycomb channels which are aligned parallel with the gas flow. These channels are nested together in honeycomb fashion so that each channel forms a honeycomb cell 26. As shown in FIG. 2, each honeycomb cell 26 is square-shaped, but it should be understood that other shapes may be used which are conducive to honeycomb nesting. As the gas moves through cell channels 26 of metallic honeycomb electrode 22, it is straightened into laminar flow, and the seeded electrons and ions from pre-ionizing cavity 20 are diffused uniformly throughout the gas.

Referring again to FIG. 1, gas from one of the small volume channels of gas diverter 15 flows through a coupling channel 28 to an insulator honeycomb 30, and gas from the other small volume channel of gas diverter 15 flows through a coupling channel 32 to a second insulator honeycomb 34. This operation is illustrated in greater detail in FIG. 2. Coupling channels 28 and 32 are aligned parallel with the gas flow and are positioned adjacent opposite ends of multiple nozzle 16. Coupling channel 28 is merely a conduit through which gas from diverter 15 flows through insulator honeycomb 30, and coupling channel 32 is merely a conduit through which gas from diverter 15 flows to insulator honeycomb 34. Insulator honeycombs 30 and 34 are made of insulating material, such as ceramic, and may have the same type of honeycomb channel construction as metallic honeycomb electrode 22. Insulator honeycomb 30 is positioned so that its honeycomb channels are aligned parallel to the flow of gas through coupling channel 28, and so that it is also abutting against a side 36 of metallic honeycomb electrode 22. Similarly, insulator honeycomb 34 is aligned so that its honeycomb channels are aligned parallel with the flow of gas through coupling channel 32, and so that it is abutting against a side 38 of metallic honeycomb electrode 22 which is opposite side 36. Thus, insulator honeycombs 30 and 34 and metallic honeycomb electrode 22 form a continuous honeycomb structure.

Gas emerging from metallic honeycomb electrode 22 at, for example, mach 0.3, flows through a laser cavity 40 into a second metallic honeycomb electrode 42 which is identical to metallic honeycomb electrode 22 and is aligned parallel with the flow of gas through laser cavity 40. A large d.c. voltage is applied between metallic honeycomb electrodes 22 and 42 by a conventional high voltage d.c. source 44 which produces a glow discharge in the gases flowing between electrodes 22 and 42. The high voltage is applied so that electrode 22 is positive with respect to electrode 42, i.e., electrode 22 is the anode and electrode 42 is the cathode. Thus, in the glow discharge region of laser cavity 40 negatively charged electrons flow from metallic honeycomb electrode 42 to metallic honeycomb electrode 22, while the positively charged ions flow in the opposite direction. An insulator honeycomb 46, which may be identical to insulator honeycombs 30 and 34, is positioned so that its honeycomb channels are aligned with the flow of gas emerging from insulator honeycomb 30, and so that it is abutting against a side 50 of metallic honeycomb electrode 42. Similarly, an insulator honeycomb 48, which is also identical to insulator honeycombs 34 and 36, is positioned so that its honeycomb channels are aligned with the flow of gas emerging from insulator honeycomb 34, and so that it is abutting against a side 52 of metallic honeycomb electrode 42. There is little lateral movement of the gases emerging from honeycomb insulators 30 and 34, and metallic honeycomb electrode 22 in laser cavity 40 since these gases are moving at very high velocities. Thus, most of the gas emerging from honeycomb insulator 30 flows through laser cavity 40 into honeycomb insulator 46, most of the gas emerging from metallic honeycomb electrode 22 flows through laser cavity 40 into metallic honeycomb electrode 42, and most of the gas emerging from honeycomb insulator 34 flows through laser cavity 40 into honeycomb insulator 48. Consequently, the glow discharge in laser cavity 40 is confined to the region where gases flow between metallic honeycomb electrodes 22 and 42. Of course, there is some intermixture of gas in cavity 40 at the boundary region defined by a straight line between side 36 of metallic honeycomb electrode 22 and side 50 of metallic honeycomb electrode 42, and also between the boundary defined by a straight line drawn between side 38 of metallic honeycomb electrode 22 and side 52 of metallic honeycomb electrode 42, but the laminar flow and high velocity of the gas results in little intermixture.

A pair of rectangular-shaped laser end mirrors 54 and 56 are positioned at opposite ends of laser cavity 40 and are aligned so that the optical laser axis they define is perpendicular to the gas flow axis. Thus, end mirrors 54 and 56 and laser cavity 40 form a conventional Fabry-Perot cavity, and laser radiation may be extracted by making one of the end mirrors partially transmissive. Alternatively, end mirror 56 may be a conventional roof top mirror to provide multiple laser paths within laser cavity 40.

The gases contained within the glow discharge region are sufficiently energized to achieve the required population inversion for laser action. Consequently, a continuous laser output is produced by the excited gases flowing transverse to the laser optical axis. Since the gases flowing at both ends of laser cavity 40 through the insulator honeycombs do not participate in the glow discharge, as described hereinabove, they remain cool throughout their transverse through laser cavity 40, while the gas in the glow discharge region increases in temperature during its traverse of laser cavity 40. FIG. 3 illustrates graphically the gas temperature versus distance traversed through laser cavity 40 for both the glow discharge gas and the cool gas at both ends of the cavity. As indicated, the glow discharge gas and the cavity end gas enter laser cavity 40 at approximately the same temperature of somewhat less than 300°K. As the glow discharge gas traverses laser cavity 40, its temperature increases approximately linearly to roughly 600°K at the entrance of metallic honeycomb electrode 42. On the other hand, the temperature of the cavity end gas remains essentially cool as it traverses laser cavity 40, so that its exit temperature does not rise appreciably.

FIG. 4 illustrates the velocity profile of the gases in laser cavity 40. Both the glow discharge gas and the cavity end gas enter laser cavity 40 at approximately mach 0.3. Since the glow discharge gas is heated during its traversal of laser cavity 40, thermal expansion of the gas along the direction of flow occurs, thereby increasing the gas velocity. The glow discharge gas velocity increases approximately linearly in laser cavity 40, and at the entrance to metallic honeycomb electrode 42 is slightly less than mach 1.0. Although there is no appreciable thermal expansion of the cavity end gas, its cross-sectional velocity profile is affected by its interaction with the laser end mirrors and the accelerating glow discharge gas. Consequently, there is some increase in its average velocity. The cool end gases passing across the inner faces of end mirrors 54 and 56 keep these mirror faces cool relative to the hot glow discharge gas by a convection effect and electrically insulate the end mirrors from the glow discharge. Furthermore, this cool gas flow at the ends of laser cavity 40 prevents the hot gases in the glow discharge region of cavity 40 from establishing a temperature gradient along end mirrors 54 and 56 that could adversely affect laser operation. The cool end gases in laser cavity 40 are not excited and do not participate in the laser action. Furthermore, these cool end gases appear essentially transparent to the carbon dioxide laser wavelengths, and thus do not attenuate the laser energy generated within the glow discharge region of laser cavity 40. Since the primary purpose of the cool end gases in laser cavity 40 is to electrically and thermally insulate the end mirrors from the hot glow discharge gases, and since there is little diffusion at the boundary regions between the cold end gases and the hot glow discharge gases, the cold end gas streams can be relatively narrow relative to the glow discharge stream. For example, the length of the laser cavity between end mirrors 54 and 56 may be 44 inches, of which the center 40 inches is the glow discharge region (corresponding to 40 inch long metallic honeycomb electrodes 22 and 42), and which 2 inches at each end of the glow discharge region is occupied by the cool end gases (corresponding to 2 inch long insulator honeycombs 30, 34, 46 and 48).

By keeping the velocity of the glow discharge gas less than mach 1.0 throughout laser cavity 40, no shock waves are produced in the cavity and laminar flow occurs throughout the cavity. By keeping the gas temperature less than 600° K throughout the cavity, laser efficiency remains high, since it is well known that the efficiency of carbon dioxide gas lasers falls off drastically above the critical temperature of 600° K. Since the exit temperature is near this critical point and the entrance temperature is low, an optical power output per mass per second is obtained. Furthermore, since the gas flow is parallel to the electrical discharge in laser cavity 40, the gas is continuously energized as it lases. This results in a nearly uniform gain or laser power across the optical cavity cross-section. Consequently the laser beam shows low beam divergence and very high brightness.

The honeycomb shape of electrodes 22 and 42 prevents an abnormal glow discharge or arcing from occurring in laser cavity 40. Arcing is very undesirable, since the gases in an arc are heated to the plasma state, substantially above the critical temperature of 600°, which prevents lasing of these gases. The very large surface area in honeycomb electrodes 22 and 42 insures sufficient current densities to produce the desired input power to the gas without arcing or abnormal glow. Furthermore, the honeycomb geometry coupled with the uniform seeding of electronion pairs in the preionizing process, as described hereinabove, produces a uniform current distribution across the glow discharge cross-section. This, in turn, ensures the lowest possible current density at electrodes 22 and 42 which further reduces the possibility of arcing or abnormal glow. The honeycomb geometry also makes the lateral diffusion distance an ion has to travel to reach a surface of electrode 42 very short. Consequently, the diffusion time is short enough to ensure the complete recombination of ions as the gas passes through honeycomb electrode 42. Electron production at honeycomb electrode 42 is enhanced by allowing it to remain at the ambient 600° K temperature of the hot gases flowing therethrough.

Heating of the gases in the glow discharge region of laser cavity 40 produces some unwanted chemical reactions between the carbon dioxide gas and the nitrogen gas. For example, oxygen atoms may be stripped from carbon dioxide and may combine with nitrogen to form carbon monoxide or carbon and various oxides of nitrogen. To reconvert these products into carbon dioxide and nitrogen, the outputs of insulator honeycombs 46 and 48 and metallic honeycomb electrode 42 are fed to a catalytic antipollution filter 58, which may be of the type described in Atmospheric Environment, Volume 1, pages 307–318, 1967 (Pergamon Press). The reconstituted output gases emerging from catalytic antipollution filter 58 are fed to a conventional water-cooled heat exchanger 60 which cools the gases. The gases then flow into the input of turbine compressor 12 to complete the gas flow cycle.

In operation, the transverse flow laser of the present invention produces continuous laser output power of 5 to 12 killowatts with greatly enhanced brightness over prior art devices. Consequently, the system will be useful as a transmitter for communications, optical radar, special welding applications, and other scientific studies.

Obviously, numerous modifications and variations of the present invention are possible in the light of the above teachings. For example, honeycomb insulators 46 and 48 and honeycomb electrode 42 could be replaced by a single metallic honeycomb electrode extending across the entire length of laser cavity 40 at ground potential. By using this arrangement any ions which diffuse into the cool end gases will be recombined in the metallic honeycomb electrode, whereas in the preferred embodiment these ions will not recombine until they are further downstream. Another modification of the present invention would be to have barium coated metallic honeycomb electrodes. Still another modification to the present invention would be to pre-ionize the gas by electron beam injection. It is therefore to be understood that within the scope of the appended claims, the invention may be practiced otherwise than as specifically described herein.

What is claimed as new and desired to be secured by Letters Patent of the United States is:

1. A closed loop transverse flow gas laser system comprising:
    an optical resonant laser cavity having a pair of laser end mirrors positioned at first opposite ends of said laser cavity to define an optical axis in said laser cavity and for stimulating a coherent beam of optical radiation along said axis;
    a source of high direct current voltage;
    a pair of metallic nested honeycomb type electrodes positioned at opposite ends of said laser cavity to define a gas flow axis in said laser cavity transverse to said optical axis, connected across said source to establish a high potential between said electrodes in said laser cavity;
    input means for causing said gas to flow at high velocity into said laser cavity along said gas flow axis, whereby said high potential between said electrodes produces a glow discharge in a first portion of said gas for producing a population inversion therein and emission of radiation therefrom and said optical resonant cavity stimulates a continuous coherent output beam along said optical axis; and
    recirculating output means for returning the gas flowing from said laser cavity to said input means to provide a closed loop operation.

2. The laser system of claim 1, further including:
    a first pair of insulator nested honeycombs positioned adjacent opposite ends of one of said pair of electrodes and having channels aligned parallel with said gas flow axis; and
    a second pair of insulator nested honeycombs positioned adjacent opposite ends of the other of said pair of electrodes and having channels aligned parallel with said gas flow axis, whereby a second portion of said gas from said input means flows through said first and said second pairs of insulator nested honeycombs to cool said laser end mirrors.

3. The laser system of claim 2, wherein said input means comprises:
    means for compressing said gas to enable said gas to flow at high subsonic velocity;
    means for removing heat from said high velocity gas; and
    means coupled to the output of said heat removing means for pre-ionizing said first portion of said gas.

4. The laser system of claim 3, wherein said input means further includes means for dividing said high velocity gas into said first portion and said second portion.

5. The laser system of claim 3, wherein said means for compressing said gas comprises a turbine compressor.

6. The laser system of claim 3, wherein said means for removing heat comprises a water cooled heat exchanger.

7. The laser system of claim 3, wherein said pre-ionizing means comprises:
    a multiple nozzle for receiving said first portion of said gas from said heat removing means and for dividing said first portion of said gas into a plurality of gas streams;
    a pre-ionizing cavity;
    a screen electrode positioned at one end of said pre-ionizing cavity and connectable to a source of pre-ionizing potential; and
    one of said pair of electrodes positioned at the opposite end of said pre-ionizing cavity and connectable to said pre-ionizing source of potential, whereby said pre-ionizing potential between said screen electrode and said one of said pair of electrodes produces weak ionization of said first portion of said gas.

8. The laser system of claim 2, wherein said output means comprises:
    means for chemically reconstituting said gas to reconvert any impurities in said gas generated in said laser cavity; and
    means coupled between said reconstituting means and said input means for removing heat from said gas.

9. The laser system of claim 8, wherein said reconstituting means comprises a catalytic antipollution filter.

10. The laser system of claim 8, wherein said means for removing heat comprises a water-heat exchanger.

* * * * *